United States Patent [19]

Jett

[11] 4,262,854
[45] Apr. 21, 1981

[54] LEVEL WINDING REEL MECHANISM FOR A BIN LEVEL INDICATOR

[75] Inventor: Richard G. Jett, Saint Charles, Ill.

[73] Assignee: Ludlow Industries, Inc., Elburn, Ill.

[21] Appl. No.: 75,760

[22] Filed: Sep. 14, 1979

[51] Int. Cl.³ .................... B65H 75/00; G01F 23/00
[52] U.S. Cl. ............................... 242/54 R; 33/126.6; 242/74
[58] Field of Search .................. 242/54 R, 74, 71.8; 33/126.6, 126.5; 324/168, 171; 73/321

[56] References Cited

U.S. PATENT DOCUMENTS

| 866,039 | 9/1907 | La May | 242/74 |
|---|---|---|---|
| 2,854,752 | 10/1958 | Heacock | 33/126.6 |
| 3,128,557 | 4/1964 | Childs | 33/126.6 |
| 3,521,367 | 7/1970 | Grynovich | 33/126.6 |
| 3,620,474 | 11/1971 | Ray | 242/74 |
| 3,629,946 | 12/1971 | Parsons | 33/126.5 |
| 3,792,307 | 6/1973 | Patsch | 33/126.6 |
| 3,838,518 | 10/1974 | Hendrickson | 33/126.6 |

*Primary Examiner*—Edward J. McCarthy
*Attorney, Agent, or Firm*—Burmeister, York, Palmatier, Hamby & Jones

[57] ABSTRACT

The level winding reel mechanism comprises a frame, a winding reel rotatably mounted on the frame, a line connected to the reel and adapted to be wound thereon, and a pulley rotatably mounted on the frame for guiding the line to the reel, the pulley having a peripheral groove therein for receiving the line, the reel having a stepped hub comprising first and second cylindrical portions having first and second different diameters with an annular shoulder between the first and second portions, the first diameter being less than the second diameter by an amount corresponding generally with the diameter of the line, the reel having first and second end flanges projecting radially from the ends of the first and second portions of the hub, the hub having anchor means therein for anchoring one end of the line, the first portion of the hub having an entry hole therein for receiving the line, the entry hole being adjacent the shoulder, the pulley having its peripheral groove in alignment with a point on the first portion of the hub spaced away from the shoulder and the center of said entry hole, the spacing between the point and the center of entry hole corresponding generally to the diameter of the line, whereby the second wrapping of the line around the hub is laid down adjacent the first wrapping, and each subsequent wrapping is laid down adjacent the preceding wrapping.

9 Claims, 7 Drawing Figures

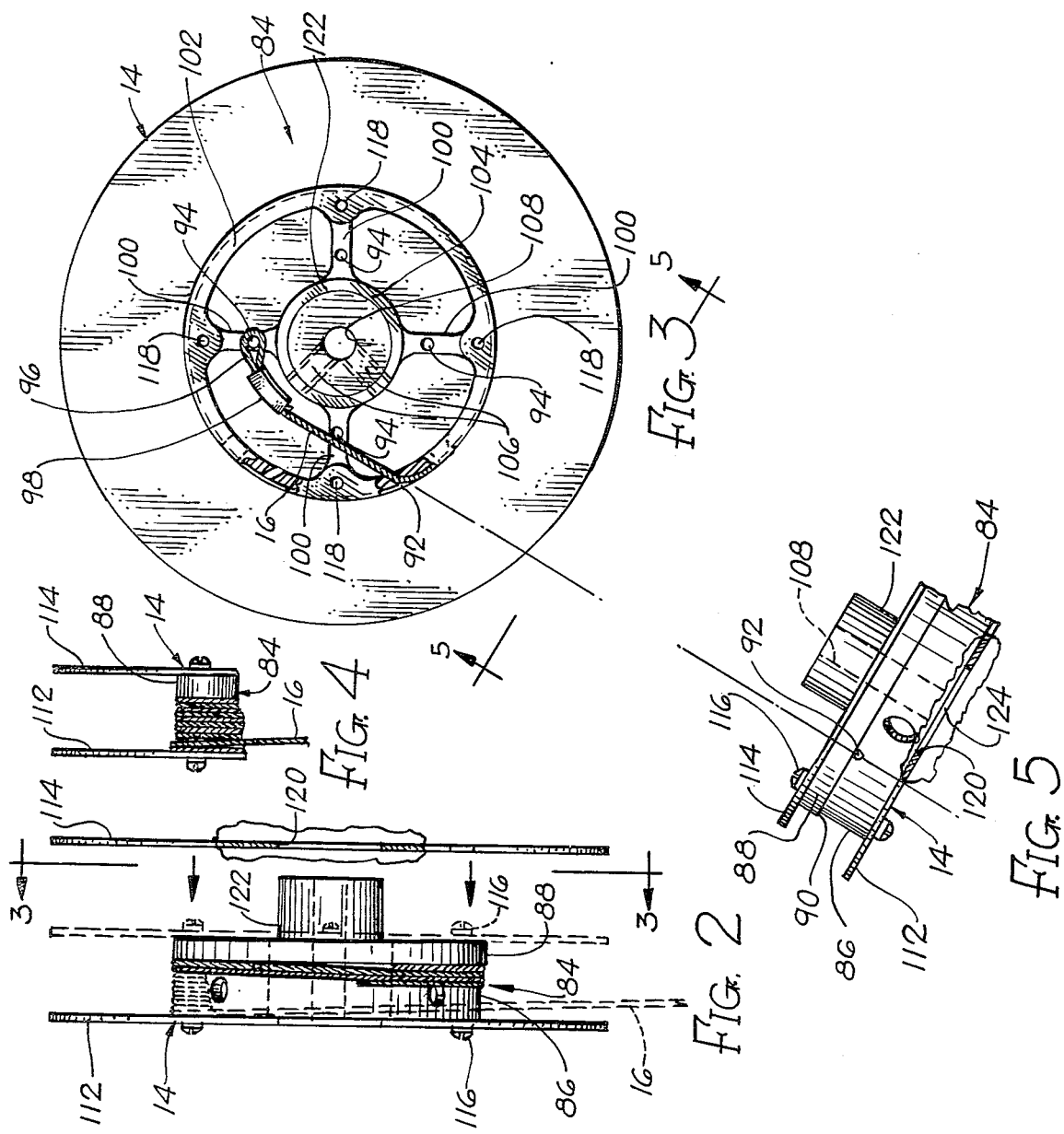

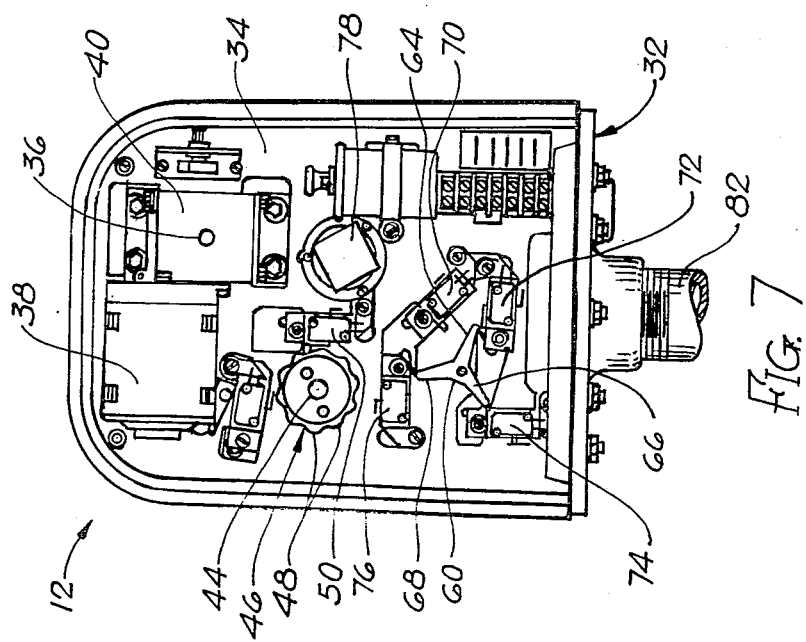
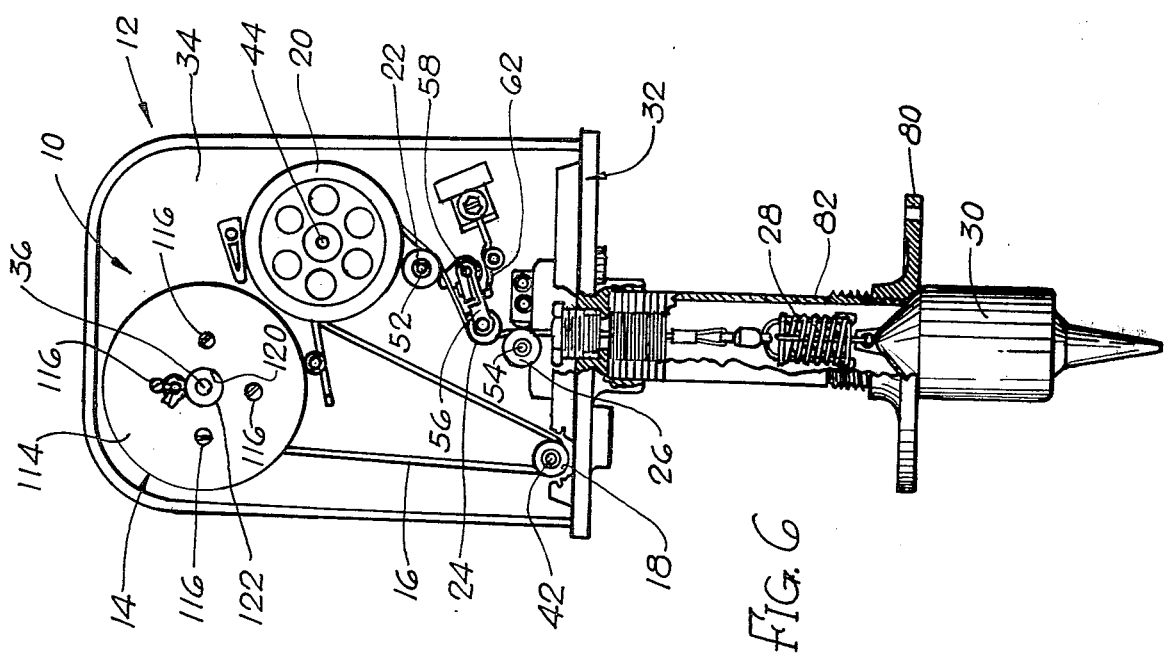

LEVEL WINDING REEL MECHANISM FOR A BIN LEVEL INDICATOR

BACKGROUND OF THE INVENTION

This invention relates to a level winding reel mechanism which will find various applications, but is particularly well adapted for level winding a cable or other line in a bin level indicator of the type having a weight which is suspended from the lower end of the cable, so that the weight can be lowered into a tank or bin until the weight comes into contact with the material in the bin. The cable is then wound up upon the reel until the weight reaches the housing of the bin level indicator, at or near the top of the bin. A bin level indicator of this type generally includes means for automatically reeling the cable out and in, so as to lower and raise the weight, and means for measuring the length of the cable which is reeled out in order to cause the weight to come into contact with the material in the bin. The measurement of the cable may be carried out either during the reeling out or the reeling in of the cable.

In bin level indicators of this type, it has been the prevailing practice to employ a reeling mechanism in which the cable or other line is jumble wound on the reel. However, in some cases, the jumble winding of the line has caused the various wrappings of the line to become entangled with one another, so as to cause jamming of the bin level indicator.

OBJECTS OF THE INVENTION

One object of the invention is to provide a reel mechanism for a bin level indicator of the reeling type, in which the line is level wound on the reel, in regular successive layers, so as to avoid any entanglement of the line.

A further object is to provide a level winding reel mechanism which is extremely simple in construction, yet is dependable in operation.

SUMMARY OF THE INVENTION

To achieve these objects, the present invention provides a level winding reel, adapted to wind up a line in a bin level indicator or the like, comprising a stepped hub including first and second substantially cylindrical portions having first and second different diameters with an annular shoulder between the first and second portions, the first diameter being less than the second diameter by an amount corresponding generally with the diameter of the line, and first and second end flanges projecting radially from the ends of the first and second portions of the hub, the hub having anchor means therein for anchoring one end of the line, the first portion of the hub having an entry hole therein for receiving the line to afford access for the line to the anchor means, the entry hole being adjacent the shoulder.

Preferably, such reel is employed in a mechanism comprising supporting frame means, means rotatably mounting the winding reel on the frame means, a line extending into the entry hole and anchored by the anchor means, a pulley for guiding the line to the reel, the line being trained around the pulley, and means rotatably mounting the pulley on the frame means with the rotary axis of the pulley parallel to the rotary axis of the reel and spaced laterally therefrom, the pulley having a peripheral groove therein for receiving the line, the pulley having its peripheral groove in alignment with a point on the first portion of the hub spaced away from the shoulder and the center of the entry hole, the spacing between such point and the center of the entry hole corresponding generally to the diameter of the line, whereby the second wrapping of the line around the hub is laid down adjacent the first wrapping, and each subsequent wrapping is laid down adjacent the preceding wrapping.

Preferably, such point with which the peripheral groove of the pulley is aligned is near the mid-point between the first and second end flanges of the reel.

The spacing between the rotary axis of the reel and the rotary axis of the pulley should be much greater than the length of the hub between the end flanges. For best operation, such spacing should be a least eight times, and preferably at least ten times, the length of the hub between the end flanges.

The diameter of the hub should be substantially greater than the diameter of the pulley. The diameter of the first portion of the hub should be at least twice the diameter of the pulley, and preferably should be at least 2.5 or three times the diameter of the pulley.

BRIEF DESCRIPTION OF THE DRAWINGS

Further objects, advantages, and features of the present invention will appear from the following description of an illustrative embodiment, such description being taken in connection with the accompanying drawing, in which:

FIG. 2 is a fragmentary view similar to a portion of FIG. 1, but showing the reel with the first layer of the cable wrapped theron, the view also showing the manner in which the end flanges of the reel may be removed.

FIG. 3 is a front elevational view partly in fragmentary section with the front end flange of the reel removed, the view being taken generally as indicated by line 3—3 in FIG. 2.

FIG. 4 is a fragmentary view, similar to a portion of FIG. 2, but showing the reel with a portion of the second layer of the cable wrapped thereon.

FIG. 5 is a fragmentary auxiliary view of the reel with the cable removed, taken generally as indicated by the line 5—5 in FIG. 3.

FIG. 6 is a front elevational view showing a bin level indicator which incorporates the level winding reel mechanism, the bin level indicator being shown partly in section and with the front cover of the housing removed.

FIG. 7 is a fragmentary rear elevational view of the bin level indicator, with the rear cover of the housing removed.

Figure 1:
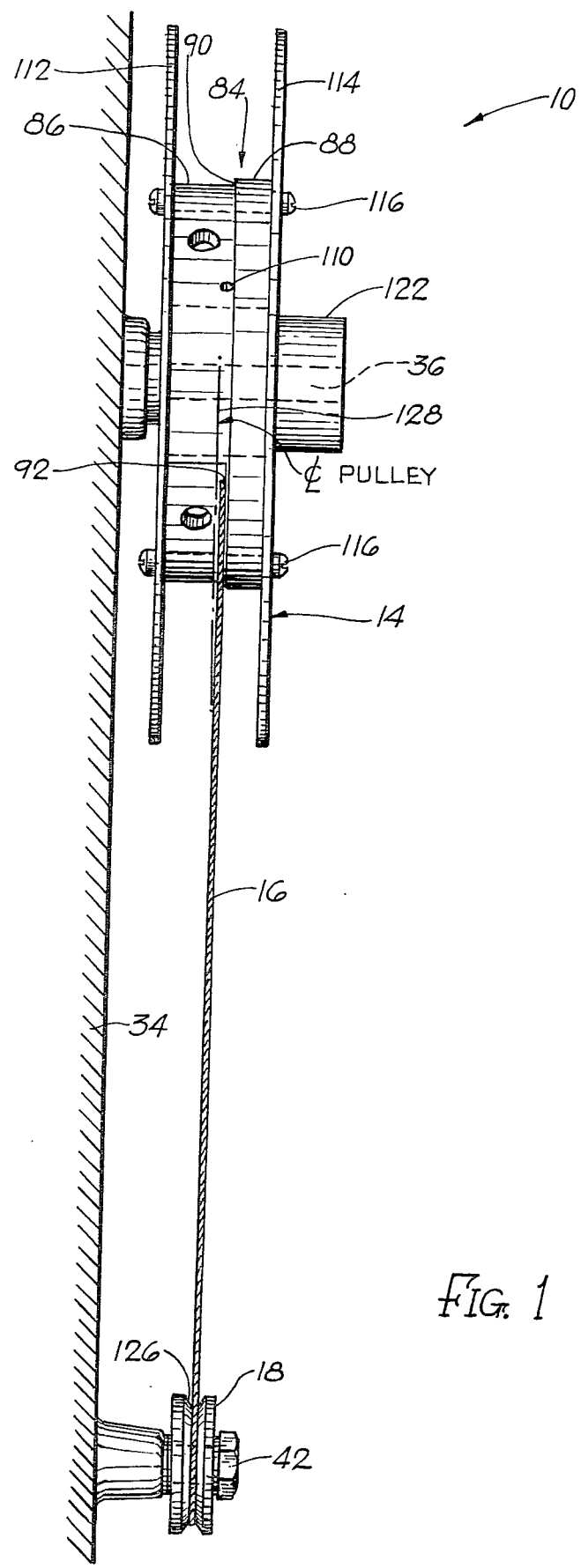
FIG. 1 is a diagrammatic side elevational view of the level winding reel mechanism to be described as an illustrative embodiment of the present invention.

With particular reference to FIGS. 1, 6, and 7, the drawings illustrate a particular embodiment of the present invention, in the form of a level winding reel mechanism 10, incorporated into a bin level indicator 12, which is shown generally in FIGS. 6 and 7. The bin level indicator 12 comprises a level winding storage reel 14, adapted to wind and unwind a cable or other line 16. The upper end of the line 16 is secured to the reel 14, so that the rotation of the reel in opposite directions will cause the line 16 to wind and unwind.

The line 16 passes downwardly from the storage reel 14 and is trained around a guide pulley 18, from which the line 16 passes upwardly and around a grooved measuring wheel or pulley 20. The line 16 then passes under a guide pulley 22, over a control pulley 24, and downwardly past a guide pulley 26. The line 16 then extends downwardly and is connected to the upper end of a spring 28 having its lower end connected to a plumb bob or weight 30. When the line 16 is reeled out, the weight 30 descends by gravity into a tank or bin, until the weight comes into contact with the material in the bin. The slackness which then develops in the line 16 causes the reeling drive to reverse, so that the line 16 is reeled in. When the weight 30 reaches its upper limit of travel, the increased tension in the line 16 causes the reeling drive to stop. The length of the line 16 which has been reeled out and re-reeled is measured by the measuring wheel 20, so as to provide an indication of the level of the material in the bin.

The illustrated bin level indicator 12 has a housing 32 with frame means 34 therein, such frame means being in the form of a generally vertical plate or casting. The front and rear sides of the frame means 34 are shown in FIGS. 6 and 7. Generally, the mechanical components of the bin level indicator 12 are mounted in front of the frame means 34, as shown in FIG. 6, while the electrical components are mounted on the rear side of the frame means 34, as shown in FIG. 7.

The level winding storage reel 14 is rotatably mounted on the frame means 34 by means which may comprise a rotatable shaft 36, adapted to be driven by a reversible electric motor 38, through a gear reduction drive mechanism 40.

The guide pulley 18 is an idler which is rotatably mounted on the frame means 34 by means which may include a bolt or pin 42. The rotary axis of the pulley 18 is parallel with the rotary axis of the storage reel 14.

The measuring wheel 20 is also rotatably mounted on the frame means 34, by means which may include a rotatable shaft 44, extending through the frame means 34 to a rotatable pulsing cam 46, which is secured to the rear end of the shaft 44.

Illustrated cam 46 has ten lobes 48 which are adapted to operate a pulsing switch 50. The operation of the switch 50 produces electrical pulses which may be counted by any suitable electrical counter, to produce an indication as to the length of the line 16 which has been reeled out or reeled in. This length measurement may be converted into a measurement which indicates the level of the material in the tank or bin.

The guide pulleys 22 and 26 are idlers which are rotatably mounted on the frame means 34 by suitable mounting means, such as bolts or pins 52 and 54. The illustrated control pulley 24 is rotatably mounted on a swingable control arm 56, which may also be referred to as a weight sensing arm. As shown, the control arm 56 is secured to a shaft 58 which is rotatably mounted on the frame means 34 and extends through the frame means to a three-armed lever 60 mounted on the rear end of the shaft 58, as shown in FIG. 7.

The illustrated control arm 56 is biased in one direction by suitable spring means illustrated as an adjustable torsion spring 62 which tends to swing the arm 56 in a clockwise direction as shown in FIG. 6. When tension exists in the cable or line 16, such tension tends to swing the arm 56 in a counterclockwise direction. Thus, the position of the swingable control arm 56 is variable, depending upon the amount of tension which exists in the line 16.

As shown in FIG. 7, the lever 60 has three arms 64, 66 and 68, adapted to operate a plurality of switches which control the operation of the reversible electric motor 38. In the illustrated bin level indicator 12, these switches comprise a reversing switch 70, operable by counterclockwise movement of the arm 64; a sounding switch 72, operable by clockwise movement of the arm 64; an OFF switch 74 operable by clockwise movement of the arm 66; and an operating light switch 76, operable by clockwise movement of the arm 68. The switches 70, 72 and 74 control a relay 78 which in turn controls the operation of the reversible electric motor 38. The switch 76 controls the operation of a lamp which is lighted when the motor 38 is running.

FIGS. 6 and 7 show the initial condition of the bin level indicator 12, when it is at rest. The weight 30 is pulled upwardly against a member 80, as shown in FIG. 6, and the resulting tension in the line 16 pulls the control arm 56 downwardly, against the force of the torsion spring 62. Such movement of the arm 56 causes the arms 64, 66 and 68 to operate the switches 72, 74 and 76, as shown in FIG. 7.

When it is desired to use the bin level indicator 12 for a measurement cycle, the electric motor 38 is caused to operate by suitable means, such as a manually operable start switch, so that the reel 14 is driven in a direction such as to reel out the cable or line 16. Accordingly, the weight 30 travels downwardly. The momentary operation of the start switch energizes the relay 78, which is latched and remains latched during the downward movement of the weight 30. During such downward movement, there is tension in the line 16, produced by the weight 30. Such tension, when balanced by the force of the torsion spring 62, causes the three arms 64, 66 ad 68 to assume positions in which the four switches 70, 72, 74 and 76 are not operated. When the weight 30 engages the material in the bin, the downward movement of the weight is stopped, with the result that the tension in the line 16 is decreased. The torsion spring 62 then causes the control arm 56 to swing upward, so that the arm 64 operates the reversing switch 70. This has the effect of unlatching the relay 78 and reversing the electric motor 38, so that the line 16 is reeled in. Accordingly, the weight 30 is pulled upwardly by the line 16. During the re-reeling of the line 16, the tension in the line 16 is such that the four switches 70, 72, 74 and 76 are not operated.

As the weight 30 is moved upwardly toward the housing 32 of the bin level indicator 12, the weight again comes into contact with the member 80 on the housing 32. As shown in FIG. 6, such member 80 takes the form of a mounting flange, secured to the lower end of a tube or pipe 82 which is secured to the housing 32 and extends downwardly therefrom. The cable or line 16 travels axially within the flange 80 and the pipe 82, when the line is reeled in and out.

When the weight 30 is moved upwardly against the flange 80, as shown in FIG. 6, the upward movement of the weight is stopped, but the motor 38 continues to operate for a brief interval, with the result that the tension in the line 16 is increased. The spring 28 between the line 16 and the weight 30 allows the tension to increase in a smooth manner, rather than with an abrupt jerk, to avoid breakage of the line 16. The increased tension causes the control arm 56 to swing downwardly, as shown in FIG. 6, against the force of the torsion spring 62. Such movement of the arm 56 causes the arms 64, 66 and 68 to operate the switches 72, 74 and 76, with the result that the motor 38 is stopped. Moreover, the operating lamp is deenergized.

The measurement function of the bin level indicator 12 is carried out during the downward movements of the line 16, by counting the pulses produced by the cam operated switch 50. This counting operation is initiated when the relay 78 is energized by the start switch, and is terminated when the relay 78 is deenergized by operation of the reversing switch 70. The total number of pulses which are counted during the downward movement of the line 16 is a measure of the length of the line 16 which is reeled out during the downward movement.

Additional cycles of the bin level indicator can be initiated manually, if desired, by operating the push button start switch, or an automatic timer can be employed to close the start switch circuit periodically, if desired.

In the past, it has been the prevailing practice to jumble wind the cable or line on the storage reel, in bin level indicators of the reeling type. This practice of randomly winding the cable on the storage reel has sometimes led to situations in which various wrappings of the cable have become entangled with one another, so seriously as to cause jamming of the reel, so as to prevent the proper unwinding of the cable therefrom.

The level winding reel mechanism 10, constituting an illustrative embodiment of the present invention, deals with this problem by causing the cable or line 16 to be level wound on the storage reel 14, so that the cable is wound in regular, successive layers. the cable 16 can then be unwound in a smooth manner, without any tangling. Moreover, the level winding of the cable 16 increases the storage capacity of the reel 14.

As shown in FIGS. 1-5, the storage reel 14 has a stepped hub 84, upon which the cable or line 16 is wound. The stepped hub 84 has first and second generally cylindrical portions 86 and 88 with an annular shoulder 90 therebetween. The first and second portions 86 and 88 have first and second diameters which are different. As shown in FIG. 1, the diameter of the first hub portion 86 is less than the diameter of the second hub portion 88. This difference in diameter preferably corresponds generally with the diameter of the cable or line 16.

The winding of the cable or line 16 is started at a point on the smaller hub portion 86, adjacent the shoulder 90. For this purpose, the smaller hub portion 86 is formed with at least one entry hole 92, through which the end portion of the cable 16 extends into the interior of the hub 84. It will be seen from FIG. 1 that the entry hole 92 is adjacent the shoulder 90, at the righthand end of the smaller hub portion 86.

As shown to the best advantage in FIG. 3, the interior of the hub 84 is preferably hollow, to provide for anchoring means within the hub, whereby the upper end of the cable 16 is anchored to the hub. Such anchoring means may assume various forms such as one or more pins or pegs 94, adapted to receive and anchor a loop 96, formed on the end of the cable 16 as shown in FIG. 3. A clamp 98 may be mounted on the cable 16 to form the loop 96.

In the construction shown in FIG. 3, there are four of the anchoring pegs 94, formed on four radial spokes or webs 100 within the hub 84. The axes of the pegs 94 are parallel with the rotary axis of the reel 14. The spokes 100 extend between a generally cylindrical outer shell 102, which provides the smaller and larger portions 86 and 88, and an inner core 104, which is adapted to be mounted on the rotatable supporting shaft 36. The core 104 may be provided with set screws 106 or other suitable means for securing the core to the shaft 36. An axial bore 108 is formed in the core 104 to receive the shaft 36.

It will be seen that the entry hole 92 for the cable 16 extends through the outer shell 102 of the hub 84. The entry hole 92 is preferably slanted so as to minimize the bending of the cable 16 at the point where it emerges from the entry hole.

It will be seen from FIG. 1 that the illustrated hub 84 has a second entry hole 110 which is intended for alternate use in situations where the reel 14 is reversed from right to left from the mounting position shown in FIG. 1. The alternate entry hole 110 is also adjacent the shoulder 90 but has a slant which is opposite from the slant of the entry hole 92. The alternate entry hole 110 is spaced around the periphery of the hub portion 86 from the entry hole 92.

The storage reel 14 has first and second end flanges 112 and 114 which extend radially from the ends of the first and second hub portions 86 and 88, to confine and contain the cable 16 as it is wound on the hub 84. The illustrated end flanges 112 and 114 are in the form of circular plates, made of suitable material such as sheet metal, for example. The illustrated flange plates 112 and 114 are secured to the ends of the hub 84 by means of screws 116, extending through holes in the plates and tapped into holes 118 in the hub 84. It will be understood that other suitable means may be employed to secure the flanges 112 and 114 to the hub 84, and that the hub and the flanges may be molded, machined, or otherwise formed in one piece, if desired. The illustrated reel 14 is made of metal, but the reel may be made of other suitable materials such as a resinous plastic material, if desired.

As shown in FIG. 2, the flange plates 112 and 114 can be removed very readily from the hub 84, if desired, simply by removing the screws 116. Each of the flange plates 112 and 114 is preferably formed with an axial opening 120 which is circular in shape. The opening 120 in the flange plate 114 is adapted to receive a reduced cylindrical pilot portion 122, formed on the corresponding end of the hub 84. The opposite end of the hub 84 has a shorter pilot portion 124 which is received in the opening 120 formed in the flange plate 112.

The reel 14 has a tendency to level wind the cable 16 around the smaller hub portion 86, in a regular helix, progressing away from the shoulder 90, toward the end flange 112. The provision of the shoulder 90 substantially prevents the hellical wrapping of the cable 16 from progressing initially in the opposite direction.

This level winding tendency of the reel 14 is enhanced and reinforced by the construction and arrangement of the guide pulley 18 which guides the cable 16 to the reel. It will be seen from FIG. 1 that the guide pulley 18 is generally cylindrical and is formed with a peripheral guide groove 126 which is generally "V" shaped in cross section. Thus, the cable 16 is centered and retained in the peripheral groove 126.

The guide pulley 18 is mounted with its rotary axis parallel with the rotary axis of the reel 14. Moreover, the pulley 18 is preferably positioned with its peripheral groove 126 in alignment with a point on the smaller hub portion 86, spaced away from the center of the entry hole 92. Such point is represented by a center line 128 in FIG. 1, such center line being the center line of the groove 126. The center line 128 may also be regarded as the edge of the plane which extends through the center of the annular groove 126. It will be seen that the center line 128 is spaced away from the shoulder 90 and is approximately at the mid-point between the end flanges 112 and 114. The spacing between the center line 128 and the center of the entry hole 92 corresponds generally with the diameter of the cable 16.

With this arrangement, as shown in FIG. 1, the first wrapping of the cable 16 starts at the entry hole 92. The second wrapping is caused to start at the center line 128 of the pulley 18. In this way the second wrapping is laid down immediately adjacent the first wrapping, because the spacing between the center line 128 and the center of the hole 92 corresponds with the diameter of the cable 16. This action insures that the wrapping of the cable 16 will be started with a regular helix, progressing away from the shoulder 90.

It will be evident that each successive wrapping of the cabel 16 will be laid down adjacent the previous wrapping, so that the wrapping of the cable 16 will continue to progress in a regular helix away from the shoulder 90 until the cable reaches the end flange 112, as shown in FIG. 2. The continued winding of the cable will start a second helical layer which will progress in the opposite direction toward the end flange 114, as shown in FIG. 4. The diameter of the first layer of the cable wrapping is substantially the same as the diameter of the larger hub portion 88, as will be evident from FIGS. 2 and 4. Thus, the second layer of the cable wrapping will progress along the larger hub portion 88 until the cable reaches the end flange 114, at which time a third helical layer will be started progressing back toward end flange 112. In this way, successive helical layers of the cable 16 will be laid down as the cable is wrapped around the reel 14. This level winding of the cable prevents any tangling of the successive wrappings.

For the best level winding action, a large spacing should be provided between the rotary axes of the reel 14 and the pulley 18. Preferably, such spacing should be at least eight times the length of the hub 84 between the end flanges 112 and 114, and it is even better for the spacing between the rotary axes to be at least ten times the length of the hub.

As the cable 16 is wound in level helical layers around the hub 84, the angle of the cable, relative to the center line 128, deviates alternately in opposite directions. This angle of deviation is preferably kept small by providing a large spacing between the rotary axes of the reel 14 and the pulley 18.

It is also preferable that the diameter of the guide pulley 18 be considerably smaller than the diameter of the hub 84. Preferably, the diameter of the smaller hub portion 86 should be at least twice the pitch diameter of the pulley 18. It is even better to increase this ratio from two to 2.5 or three, to improve the level winding action of the reel mechanism 10.

The line 16 is preferably in the form of a stranded wire cable, made of stainless steel, to provide high strength, durability, and resistance to corrosion. However, the line 16 may be made of any other suitable material, such as natural or synthetic fibers of an organic character.

The guide pulley 18 may be made of any suitable material, such as a resinous plastic or metal. Initially, before the winding of the cable 16 is started, there is a small angle between the cable 16 and the center line 128 of the pulley 18. This angle is due to the fact that the center line 128 is spaced from the center of the entry hole 92 by an amount corresponding generally with the diameter of the cable 16. This small angle insures that the first wrapping of the cable 16 will be laid down in a helix, and a second wrapping will be laid down adjacent to the first wrapping.

Each subsequent wrapping is laid down adjacent the previous wrapping, because each wrapping projects outwardly from the hub 84 and acts as a guide for the next wrapping.

This action insures that the first layer of the wrapped cable 16 around the smaller hub portion 86 will be level wound in a regular helix, proceeding away from shoulder 90 toward the end flange 112.

When the cable 16 reaches the end flange 112, a second helical layer is started, progressing from the end flanges 112 toward the other end flange 114, as shown in FIG. 4. The initial portion of the second layer is wound over the first layer, until the larger hub portion 88 is reached, whereupon the final portion of the second layer is wound around the large hub portion 88. The diameter of the larger hub portion 88 is substantially the same as the diameter of the first layer of the cable 16, wrapped around the smaller hub portion 86. This is due to the fact that the step between the smaller hub portion 86 and the larger portion 88 is substantially the same as the diamter of the cable.

When the second layer of the cable 16 reaches the end flange 114, a third layer is started, progressing as a helical winding toward the end flange 112. This level winding of the cable 16 is successive helical layers is repeated until the cable 16 has been reeled in as for as possible, until the weight 30 engages the flange 80.

The level winding of the cable 16 insures that the cable can be unwound in a smooth manner, without any tangling of the cable.

I claim:

1. A level winding reel mechanism, comprising
supporting frame means,
a winding reel,
means rotatably mounting said winding reel on said frame means,
a line connected to said reel and adapted to be wound upon said reel,
said line being generally circular in cross-section,
a pulley for guiding said line to said reel,
said line being trained around said pulley,
and means rotatably mounting said pulley on said frame means with the rotary axis of said pulley parallel with the rotary axis of said reel and spaced laterally therefrom,
said pulley having a peripheral groove therein for receiving said line,
said reel having a stepped hub comprising first and second substantially cylindrical portions having first and second different diameters with an annular shoulder between said first and second portions,
said first diameter being less than said second diameter by an amount corresponding generally with the diameter of said line,
said reel having first and second end flanges projecting radially from the ends of said first and second portions of said hub,
said hub having anchor means therein for anchoring one end of said line,
said first portion of said hub having an entry hole therein for receiving said line to afford access for said line to said anchor means,
said entry hole being adjacent said shoulder, said pulley having its peripheral groove in alignment with a point on said first portion of said hub spaced away from said shoulder and also away from the center of said entry hole, the spacing between said point and the center of said entry hole corresponding generally to the diameter of said line, whereby the second wrapping of said line around said hub is laid down adjacent the first wrapping, and each subsequent wrapping is laid down adjacent the preceding wrapping.

2. A reel mechanism according to claim 1, in which said point with which said groove is aligned is approximately at the mid-point between said first and second end flanges.

3. A reel mechanism according to claim 1, in which the distance between the axes of said reel and said pulley is at least eight times the length of said hub between said first and second end flanges.

4. A reel mechanism according to claim 1, in which the distance between the axes of said reel and said pulley is at least ten times the length of said hub between said first and second end flanges.

5. A reel mechanism according to claim 1, in which the diameter of said first portion of said hub is at least twice the diameter of said pulley.

6. A reel mechanism according to claim 1, in which the diameter of said first portion of said hub is at least 2.5 times the pitch diameter of said pulley.

7. A reel mechanism according to claim 1, in which the diameter of said first portion of said hub is approximately three times the pitch diameter of said pulley.

8. A level winding device, comprising a stepped hub including first and second substantially cylindrical portions having first and second different diameters with an annular shoulder between said first and second portions, a line connected to said hub and adapted to be wound thereon, said first diameter of said hub being less than said second diameter thereof by an amount corresponding generally with the diameter of said line, said line being generally circular in cross-section, and first and second end flanges projecting radially from the ends of said first and second portions of said hub, said hub having anchor means therein for anchoring one end of the line, said first portion of said hub having an entry hole therein for receiving said line to afford access for said line to said anchor means, said entry hole being adjacent said shoulder.

9. A reel according to claim 8, in which said shoulder is near the mid-point between said first and second end flanges.

* * * * *

UNITED STATES PATENT AND TRADEMARK OFFICE
CERTIFICATE OF CORRECTION

PATENT NO. : 4,262,854
DATED : April 21, 1981
INVENTOR(S) : Richard G. Jett

It is certified that error appears in the above-identified patent and that said Letters Patent are hereby corrected as shown below:

Column 8, line 15, "flanges 112" should be -- flange 112 --

Column 8, line 29, "is" (first occurrence) should be -- in --

Column 10, line 6, after "winding" insert -- reel --

Signed and Sealed this

Twenty-eighth Day of July 1981

[SEAL]

Attest:

Attesting Officer

GERALD J. MOSSINGHOFF

Commissioner of Patents and Trademarks